United States Patent [19]

Engle et al.

[11] 4,085,800

[45] Apr. 25, 1978

[54] PLUGGING EARTH STRATA

[75] Inventors: Charles J. Engle; John H. Runnels, both of Bartlesville, Okla.

[73] Assignee: Phillips Petroleum Company, Bartlesville, Okla.

[21] Appl. No.: 748,336

[22] Filed: Dec. 7, 1976

[51] Int. Cl.² .................... E21B 43/24; E21B 33/138
[52] U.S. Cl. .................................. 166/288; 166/272; 166/303; 166/294
[58] Field of Search ............... 166/288, 272, 303, 261, 166/273, 263, 294

[56] References Cited

U.S. PATENT DOCUMENTS

| 956,058 | 4/1910 | Elten | 166/303 |
|---|---|---|---|
| 3,330,346 | 7/1967 | Jacobs et al. | 166/273 |
| 3,351,132 | 11/1967 | Dougan et al. | 166/272 X |
| 3,412,793 | 11/1968 | Needham | 166/303 X |
| 3,412,794 | 11/1968 | Craighead | 166/272 |
| 3,457,996 | 7/1969 | Parker | 166/188 |
| 3,464,491 | 9/1969 | Froning | 166/261 |
| 3,500,931 | 3/1970 | Sloan | 166/303 |
| 3,993,133 | 11/1976 | Clampitt | 166/288 X |

*Primary Examiner*—Stephen J. Novosad

[57] ABSTRACT

A noncondensible gas is used to preheat a portion of a permeable strata prior to plugging thereof by steam containing a surfactant. Once the desired portion of the permeable strata is plugged, steam without a surfactant is utilized for production of oil from the less permeable oil-bearing formations.

11 Claims, No Drawings

PLUGGING EARTH STRATA

BACKGROUND OF THE INVENTION

This invention relates to a process for plugging high permeability earth strata. In particular, it relates to a process for plugging high permeability earth strata using foam containing condensible gas and a surfactant.

To increase oil well production, steam can be cyclically injected into the strata to reduce the viscosity of the oil in the vicinity of the well bore, so that oil flows more readily into the well bore (this method when repeated is called cyclic steam stimulation or the "huff-puff" system). The production can also be increased by injecting steam into a well bore for the purpose of pushing oil from the oil-bearing formation into another nearby well (this is called a direct steam drive system). If the formation around the well bore includes strata of varying permeability, to allow stimulation of production by either technique from less permeable strata, the highly permeable strata are plugged prior to steam injection. One of the most successful methods of plugging the permeable strata is described in U.S. Pat. No. 3,412,793. In accordance with this method, a surface-active agent is added to the steam and caused to foam by action of the steam pushing through the surfaces of the more permeable strata. The foam has steam as its gaseous phase and is, therefore, stable only as long as the temperature remains above the boiling point of water at reservoir pressure. When the temperature drops below that point, the foam collapses, thereby restoring the original permeability to the previously plugged strata and allowing oil to flow therethrough. In some applications it is desirable to plug only a portion of the strata.

One problem associated with plugging strata or portions thereof using steam-surfactant foam stems from the fact that the strata to be plugged is initially at a temperature lower than the boiling point of water (at operating pressures). Thus, steam-surfactant mixture introduced initially into the highly permeable strata serves merely to raise the temperature of strata and a stable foam does not form until the temperature, in the portion of the strata into which the mixture is injected, reaches the temperature above the boiling point of water at operating pressures. Not only is a portion of the steam-surfactant mixture wasted during the initial stage of operation, but also, large amounts of liquids formed inside the formation can interfere with subsequent oil production and accelerate the heat transfer from the foam, thereby reducing its useful life. Furthermore, to increase the heat transfer during the heating stage of the operation, the steam-surfactant mixture is at an extremely high temperature. This limits the choice of surfactants to those which can withstand those temperatures without undergoing thermal decomposition. Even when relatively high temperature steam is used, several days of steam injection are required to heat up the strata to a point where a stable foam can be formed.

The present invention obviates the problem discussed above.

Thus, one object of the present invention is to provide an improved process for plugging permeable strata or portions thereof using foam which contains steam as its gaseous phase.

Another object of the invention is to increase the efficiency of the process for plugging highly permeable strata or portions with foam formed with steam as a gaseous phase.

A further object of the invention is to reduce the amount of water formed in the strata during plugging operation.

Still another object of the invention is to reduce the amount of steam-surfactant mixture needed for plugging of a highly permeable strata or portions thereof.

A still further object of the invention is to reduce the energy requirements of the process for plugging permeable zones.

Still another object of the invention is to reduce the time required for plugging zones of a permeable strata.

A still further object of the invention is to increase the number of surfactants that can be chosen for the use in the process of plugging permeable strata.

Still another object of the invention is to provide an improved process for stimulation of production from oil wells.

Other objects of the invention will become apparent to one skilled in the art upon studying this disclosure.

SUMMARY OF THE INVENTION

In accordance with one aspect of the invention, a hot, noncondensible gas is used to preheat a portion of a permeable strata to a temperature above the boiling point of water at operating pressure. A mixture of steam and a surfactant is then introduced into the preheated portion of the permeable strata and allowed to form a foam, thereby plugging said permeable strata. Steam, alone, can then be utilized for stimulating production of oil from less permeable strata.

In accordance with another aspect of the invention, a carbon dioxide gas is compressed, thereby its temperature and pressure increased. The hot, compressed $CO_2$ gas, having a temperature above the boiling point of water (at operating pressure), is then introduced into a highly permeable strata and allowed to heat up a portion of the permeable strata until the temperature of that portion is raised above the boiling point of water at the reservoir pressure. A mixture of steam and a surfactant is then injected into the permeable strata, resulting in formation of a foam which plugs the permeable strata. Steam, alone, can then be utilized for stimulating production of oil from less permeable oil containing strata either by direct drive or cyclic stimulation.

Other aspects of the invention will become apparent to those skilled in the art upon studying this specification and the appended claims.

DETAILED DESCRIPTION OF THE INVENTION

In the process for plugging permeable zones by foam having steam as its gaseous phase, an immediate formation of foam is assured by preheating with a hot, noncondensible gas the portion of the permeable zone which is sought to be plugged.

The invention is applicable to any process for stimulation of oil production from subterranean formations in which, at least one strata or a portion thereof is sought to be plugged by foam which has steam as its gaseous phase. It is especially useful in the process for plugging highly permeable formations with foam having steam as its gaseous phase prior to increasing of production of less permeable formations using steam alone. The foam plugging the more permeable strata collapses when the temperature of the strata falls below the boiling point of water at the pressure of the strata. Then, if the more permeable strata contains any oil, these can be treated with steam alone to produce oil.

The gases, which are useful for preheating portions of the strata in accordance with this invention, are generally noncondensible gases, i.e., gases that do not condense under operating conditions of the process. It is preferred to use gases which are easily and cheaply available in large quantities, especially those that are noncorrosive and do not present health and environmental hazards, such as: air, carbon dioxide, nitrogen, methane, ammonia, and flue gas. Carbon dioxide is especially preferred because in addition to other advantages, it is soluble in oil and thereby able to reduce the viscosity of the oil.

The temperature, to which the portion of the formation which is sought to be plugged is preheated, depends upon economic considerations; however, in most applications it is preferable to raise the temperature of the portion of the formation, to at least slightly above the boiling point temperature of water at the pressure of the formation, so that there is no condensation of water from the steam-surfactant mixture and so that foam can be generated instantly. Usually that temperature is between about 212° F and 600° F (100° C–316° C). The temperature of the gas should be sufficiently above the desired temperature of the formation to permit rapid heat exchange. Usually, the temperature differential is from about 100° F to about 300° F (56° C–167° C). The gas can be heated to the desired temperature by compression or in a heat exchanger at the surface or in the bore hole. Hot exhaust from a gas turbine or the like can also be used. In most applications, for economic reasons, heating by compression of the gas in the vicinity of the injection point or heating of the gas inside the bore hole is preferred. The heating of gas by compression is not only relatively inexpensive, but it also can result in gas having preselected injection pressure. This pressure can vary on the particular formation, but usually ranges from about 15 psia to about 3000 psia (103.42–20,684.27 kPa).

The gas can be injected into the strata through the well bore and supplied thereto until the temperature in the predetermined portion of the strata and at a distance from the injection well reaches the desired level. As soon as the temperature is at the desired level, the steam-surfactant mixture is introduced into the strata. The surfactant foams by the action of steam rushing through the strata resulting in a foam which plugs the more permeable strata. The surfactants useful for this process include nonionic type such as; Plurofac A26 and Pluronics F68 manufactured by Wyandotte Chemical Company, alkyl phenoxy polyethoxy ethanols, including Triton X-100, produced by Rohm and Hass Company, Igepal CO-990, Igepal DJ 970, and Igepal DM 730 produced by GAF Corporation, Chemical Division. Also satisfactory in the practice of this invention are anionic and cationic surfactants. Examples of the former include Cor 180 manufactured by Chemical Oil Recovery Company, Orvus manufactured by Proctor and Gamble, alkyl aryl sulfonates including Alconox produced by Alconox, Inc., and Trend produced by Purex Corp., Ltd. Among the latter are Monofluro 31 and 71 manufactured by International Chemical, Inc., stearyl amine polyethylene oxides including Ethomeen 18/60 produced by Armak Company and n-alkyl trimethyl ammonium chlorides including Arquad C-50 produced by Armak Company.

Although the foam has been described as containing steam as its gaseous phase, any gas which is condensible at the original temperature and pressure conditions in the particular strata can be used to produce a temporary, self-collapsing foam. Additionally, small amounts of noncondensible gases can be mixed with the condensible gas in order to vary the length of life of the foam. Steam is merely preferred because of its low cost and ready availability.

The amount of surfactant used varies depending upon the particular surfactant chosen and the desired lifetime of the foam. Generally, the larger the amount of the surfactant, the longer is the life of the foam thus produced. In most applications, the concentration of surfactant in foam is from about 0.5 to about 10% by weight.

After the desired strata is plugged by the foam, the production of oil from other strata can be stimulated by any suitable method, such as by introduction of steam either to melt waxes and reduce the viscosity of oils surrounding the well bore, or to directly drive the oil through the strata into another nearby well bore.

Once the lower permeability strata is exhausted and the foam in the higher permeability zone is collapsed, the steam can be used to stimulate production in the higher permeability zone (if that zone contains any oil). The efficiency of oil production from the higher permeability strata is improved by the present invention because the amount of water condensed during plugging of that strata is greatly reduced.

Variations and modifications which become obvious to one skilled in the art upon studying this disclosure and that fall within the spirit of this invention are intended to be included within its scope. For example, although this invention was described in connection with secondary recovery methods, it is not limited to secondary recovery techniques. It can be used, for instance, in the process for primary recovery of heavy oil (tar sands). The more permeable strata can be heated by the method of this invention and then plugged by the temporary plug in accordance with the method of U.S. Pat. No. 3,412,793. The less permeable strata can be produced first, and after collapsing the foam the more permeable strata (if there is any oil therein) can then be produced.

The following calculated example is included to further describe the invention and is not intended to limit the scope of the invention in any manner.

EXAMPLE

| Reservoir Conditions | |
|---|---|
| Pay thickness | 10 ft. |
| Porosity | 30 percent |
| Permeability | 2 Darcy |
| Residual oil in place | 50 percent |
| Reservoir pressure | 150 psig |
| Depth of well | 2000 ft. |
| Bottom hole temperature | 110° F |

First Step

To warm up formation:

Using a downhole combustion heater as described in U.S. Pat. No. 3,456,721, combustion gases create a high temperature around and adjacent to the borehole prior to the steam-surfactant injection.

| | |
|---|---|
| Burner exhaust gas temperature | 400° F |
| Injection gas pressure | 200 psig |
| Hot gas injection rate | 500,000 SCF/day |
| Injection time for hot gases | 3 days |
| Temperature of borehole formation | |

-continued

| | |
|---|---|
| around well after 3 days | in excess of 300° F |

Second Step

During which steam and surfactant slug is injected, followed by steam injection from the surface:

| | |
|---|---|
| Steam injection temperature | 425° F |
| Steam injection pressure | 200 psig |
| Heat content of steam | 1200 BTU/lb |
| Steam injection rate | 20 MM BTU/hr. |
| Slug of surfactant (3 percent based on weight of water in the steam) (Surfactant is Aerosol A 102 sold by Dow Chemical Co.) | 200 gallons |
| Steam-surfactant plus steam injection | 14 days |
| Temperature of borehole formation around well after 14 days | excess of 400° F |
| Soak time (well closed in) | 5 days |
| Production time | 6 months |
| Repeat steps 1 and 2. | |

We claim:

1. A process for temporarily plugging of a permeable strata in subterranean oil-bearing formations which comprises:
 (a) introducing into said permeable strata a sufficient amount of a noncondensible gas, the temperature of which is higher than that of the strata to raise the temperature of the strata; then, while at substantially said raised temperature,
 (b) injecting into the strata, steam containing a sufficient amount of a surfactant to form a foam having steam as a gas phase thereof to plug said strata; and
 (c) allowing said foam to collapse by condensation of said steam when said strata cools to the temperature below the boiling point of water at the pressure of the strata.

2. A process as claimed in claim 1 wherein
said noncondensible gas is at least one of air, methane, carbon dioxide, nitrogen, flue gas, and ammonia;
further comprising:
heating the noncondensible gas by compressing it in the vicinity of the point of introduction prior to the introduction step.

3. A process as claimed in claim 1 wherein
the temperature of the noncondensible gas is in the range from about 212° F to about 600° F (100° C–316° C); and
the temperature of the strata is raised to a temperature above boiling point of water at pressure in the strata.

4. A process as claimed in claim 1 further comprising:
 (d) injecting, prior to step (c), steam into strata which was not plugged in step (b) to stimulate oil production therefrom.

5. A process as claimed in claim 4 further comprising:
repeating step (d) after said foam is collapsed to stimulate oil production from the strata plugged in step (b).

6. A process as claimed in claim 1 wherein said noncondensible gas is carbon dioxide.

7. A process as claimed in claim 1 further comprising heating the noncondensible gas in the downhole.

8. A process as claimed in claim 7 wherein said noncondensible gas is carbon dioxide.

9. A process for stimulating the oil production of permeable strata in a subterranean oil-bearing formation whereby the highly permeable strata are plugged by a surfactant-steam mixture prior to steam injection in which the improvement comprises:
preheating the portion of the strata to be plugged by injecting into said portion of the strata a noncondensible gas, the temperature of which is higher than that of the strata, then, while the preheated portion of the strata is at substantially its preheated temperature, injecting the surfactant-steam mixture to plug the highly permeable strata.

10. A process as in claim 9 wherein said noncondensible gas is at least one of air, methane, carbon dioxide, nitrogen, flue gas, and ammonia;
with the improvement further comprising heating of the noncondensible gas by compressing it in the vicinity of the injection point prior to the injection of the noncondensible gas into the strata.

11. A process as in claim 9 wherein the temperature of the noncondensible gas is in the range from about 212° F to about 600° F (100° C–316° C); and
the preheating of the portion of the strata to be plugged results in heating said portion of the strata to a temperature above the boiling point of water at the pressure in the strata.

* * * * *